(12) United States Patent
Lee et al.

(10) Patent No.: US 12,725,739 B2
(45) Date of Patent: Sep. 1, 2026

(54) MULTILAYERED CAPACITOR AND MANUFACTURING METHOD THEREOF

(71) Applicant: SAMSUNG ELECTRO-MECHANICS CO., LTD., Suwon-si (KR)

(72) Inventors: Myungwoo Lee, Suwon-si (KR); Haesol Jung, Suwon-si (KR); Wonsik Jeong, Suwon-si (KR); Sungsoo Choi, Suwon-si (KR); Won Woo Lee, Suwon-si (KR); Gunhwan Ryu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 356 days.

(21) Appl. No.: 18/235,065

(22) Filed: Aug. 17, 2023

(65) Prior Publication Data

US 2024/0304391 A1 Sep. 12, 2024

(30) Foreign Application Priority Data

Mar. 6, 2023 (KR) ........................ 10-2023-0029329

(51) Int. Cl.
*H01G 4/30* (2006.01)
*C04B 35/468* (2006.01)
(Continued)

(52) U.S. Cl.
CPC ........... *H01G 4/30* (2013.01); *C04B 35/4682* (2013.01); *C04B 35/64* (2013.01); *H01G 4/012* (2013.01); *H01G 4/1227* (2013.01)

(58) Field of Classification Search
CPC ........ H10G 4/30; H01G 4/012; H01G 4/1227; C04B 35/4682; C04B 3535/64
(Continued)

(56) References Cited

U.S. PATENT DOCUMENTS 6,917,513 B1 7/2005 Kim et al.
2009/0264276 A1 10/2009 Yamashita et al.
(Continued)

FOREIGN PATENT DOCUMENTS

JP 2002193667 A * 7/2002
JP 4525788 B2 8/2010
(Continued)

OTHER PUBLICATIONS

Extended European Search Report dated Mar. 31, 2025 issued in corresponding European Patent Application No. 23207689.3.

*Primary Examiner* — Arun Ramaswamy
(74) *Attorney, Agent, or Firm* — Morgan, Lewis & Bockius LLP

(57) ABSTRACT

A multilayered capacitor includes a capacitor body including a dielectric layer and an internal electrode, and an external electrode outside the capacitor body, wherein the dielectric layer includes a plurality of dielectric crystal grains, the dielectric crystal grains include $Ba_x(Ti_{1-y}Zr_y)O_3$ as a main component and satisfy $0<y\leq0.0018$ at a center of the dielectric crystal grains, D50 of the dielectric crystal grains is about 130 nm to about 170 nm, and a coefficient of variation (standard deviation of size/D50) of the dielectric crystal grain size is 35% to 45%.

10 Claims, 5 Drawing Sheets

(51) Int. Cl.
*C04B 35/64* (2006.01)
*H01G 4/012* (2006.01)
*H01G 4/12* (2006.01)

(58) Field of Classification Search
USPC ..... 361/301.4, 311, 312, 321.1, 321.4, 321.5
See application file for complete search history.

(56) References Cited

U.S. PATENT DOCUMENTS

| | | | |
|---|---|---|---|
| 2010/0014210 A1 | 1/2010 | Nakamura et al. | |
| 2011/0118104 A1 | 5/2011 | Hashimoto et al. | |
| 2016/0079002 A1 | 3/2016 | Takeda et al. | |
| 2016/0155570 A1* | 6/2016 | Shimada | B32B 18/00 29/25.42 |
| 2020/0051742 A1 | 2/2020 | Park | |
| 2022/0415576 A1 | 12/2022 | Tsushima et al. | |
| 2023/0207209 A1* | 6/2023 | Lee | H01G 4/30 361/301.4 |

FOREIGN PATENT DOCUMENTS

| | | | |
|---|---|---|---|
| JP | 2016-060690 A | 4/2016 | |
| JP | 2016-117605 A | 6/2016 | |
| KR | 101792283 B1 * | 11/2017 | C01G 25/02 |

* cited by examiner

MULTILAYERED CAPACITOR AND MANUFACTURING METHOD THEREOF

CROSS-REFERENCE TO RELATED APPLICATION

This application claims priority to and the benefit of Korean Patent Application No. 10-2023-0029329 filed in the Korean Intellectual Property Office on Mar. 6, 2023, the entire contents of which are incorporated herein by reference.

BACKGROUND OF THE INVENTION

(a) Field of the Invention

This disclosure relates to a multilayered capacitor and a manufacturing method thereof.

(b) Description of the Related Art

Recently, as electronic devices have rapidly become multifunctional and down-sized, electronic parts also have rapidly been down-sized and improved in performance. In addition, high reliability of the electric devices used in automobiles, network equipment, or the like and the electronic parts for industrial use have been increasingly greatly required.

In order to meet such market demands, competition for technology development of passive parts such as inductors, capacitors, or resistors is being accelerating. In particular, required are lots of efforts to preoccupy the market by developing various products of multilayered capacitors (MLCC), which are the passive parts and whose use and usage are continuously increasing.

In addition, the multilayered capacitors are manufactured by stacking dielectric layers and internal electrodes and used in various electronic devices such as mobile phones, laptops, LCD TVs, and the like. In particular, as automobile electronic control technology is developed, a demand for the multilayered capacitors for vehicles is increasing, and as the electronic devices for vehicles are down-sized and highly functional, the multilayered capacitors are required of high-temperature moisture resistance characteristics.

SUMMARY OF THE INVENTION

One aspect of the present disclosure may provide a multilayered capacitor having improved high-temperature moisture resistance and withstand voltage characteristics by suppressing oxygen vacancies of dielectric crystal grains included in a dielectric layer.

A multilayered capacitor according to some embodiments includes a capacitor body including a dielectric layer and an internal electrode, and an external electrode outside the capacitor body, wherein the dielectric layer includes a plurality of dielectric crystal grains, the dielectric crystal grains include $Ba_x(Ti_{1-y}Zr_y)O_3$ as a main component and satisfy $0<y\leq0.0018$ at a center of the dielectric crystal grains, D50 of the dielectric crystal grains is about 130 nm to about 170 nm, and a coefficient of variation (standard deviation of size/D50) of the dielectric crystal grain size is about 35% to about 45%.

The dielectric crystal grains may satisfy $0.00005<y\leq0.0018$ at the center of the dielectric crystal grains.

The dielectric crystal grains may include about 0.5 parts by mole to about 1.0 part by mole of $Dy_2O_3$, about 0.25 parts by mole to about 0.75 parts by mole of $Tb_2O_3$, 0 parts by mole to about 0.3 parts by mole of $MnO_2$, about 0.05 parts by mole to about 0.15 parts by mole of $V_2O_5$, about 1.0 part by mole to about 2.0 parts by mole of $BaCO_3$, about 0.5 parts by mole to about 3.0 parts by mole of $SiO_2$, and about 0.4 parts by mole to about 0.6 parts by mole of $Al_2O_3$ as subcomponents based on 100 parts by mole of the main component.

At least one of the dielectric crystal grains may have a core-shell structure, wherein the shell of the core-shell structure may include all subcomponents in an amount of greater than about 0.1 moles and less than about 30.0 moles relative to 100 moles of the main component, and the core of the core-shell structure may include all subcomponents in an amount of less than or equal to about 0.1 moles relative to 100 moles of the main component.

An average thickness of the dielectric layer may be about 2.0 μm to about 3.5 μm.

A multilayered capacitor according to some embodiments includes a capacitor body including a dielectric layer and an internal electrode, and an external electrode disposed on an outer surface of the capacitor body, wherein the dielectric layer includes a plurality of dielectric crystal grains, the dielectric crystal grains include $Ba_x(Ti_{1-y}Zr_y)O_3$ as a main component and satisfy $0<y\leq0.0018$ at a center of the dielectric crystal grains, and the dielectric crystal grains include about 0.5 parts by mole to about 1.0 part by mole of $Dy_2O_3$, about 0.25 parts by mole to about 0.75 parts by mole of $Tb_2O_3$, 0 parts by mole to about 0.3 parts by mole of $MnO_2$, about 0.05 parts by mole to about 0.15 parts by mole of $V_2O_5$, about 1.0 part by mole to about 2.0 parts by mole of $BaCO_3$, about 0.5 parts by mole to about 3.0 parts by mole of $SiO_2$, and about 0.4 parts by mole to about 0.6 parts by mole of $Al_2O_3$ as subcomponents based on 100 parts by mole of the main component.

D50 of the dielectric crystal grains may be about 130 nm to about 170 nm.

A coefficient of variation (standard deviation of size/D50) of the dielectric crystal grain size may be about 35% to about 45%.

An average thickness of the dielectric layer may be about 2.0 μm to about 3.5 μm.

At least one of the dielectric crystal grains may have a core-shell structure, wherein the shell of the core-shell structure may include all subcomponents in an amount of greater than about 0.1 moles and less than about 30.0 moles of all subcomponents based on 100 moles of the main component, and the core of the core-shell structure may include all subcomponents in an amount of less than or equal to about 0.1 moles based on 100 moles of the main component.

A method for manufacturing a multilayered capacitor according to some embodiments includes preparing a dielectric powder including $Ba_x(Ti_{1-y}Zr_y)O_3$ ($0<y\leq0.0018$), preparing a dielectric green sheet using the dielectric powder and forming a conductive paste layer on the surface of the dielectric green sheet, stacking dielectric green sheets having a conductive paste layer formed thereon to manufacture a dielectric green sheet stack, firing the dielectric green sheet stack to manufacture a capacitor body, and forming an external electrode on one surface of the capacitor body.

The preparing of the dielectric powder may include adding a zirconium (Zr) precursor while wet-mixing a barium (Ba) precursor and a titanium (Ti) precursor to prepare a raw material mixture, and calcining the raw material mixture to prepare a dielectric powder.

The preparing of the dielectric powder may further include drying and dry-grinding the raw material mixture.

The preparing of the dielectric powder may further include wet-grinding the dielectric powder, followed by drying and dry-grinding.

The barium (Ba) precursor may include $BaO_2$, $BaTiO_3$, $BaCO_3$, BaO, or a combination thereof.

The titanium (Ti) precursor may include titanium dioxide, titanium diisopropoxide diacetyl acetonate (TPA), titanium alkoxide, or combinations thereof.

The zirconium (Zr) precursor may include $ZrO_2$, $ZrCO_3$, $ZrSO_4$, or combinations thereof.

The calcining may be performed at about 800° C. to about 1000° C. for about 1 hour to about 8 hours under a vacuum or normal pressure atmosphere.

The dielectric green sheet may be manufactured by mixing dielectric powder and subcomponent powder to prepare a mixture of a main component and subcomponents, mixing the mixture of a main component and subcomponents with a solvent and an additive to prepare a dielectric slurry, and molding the dielectric slurry into a sheet shape.

The subcomponent powder may include about 0.5 parts by mole to about 1.0 part by mole of $Dy_2O_3$, about 0.25 parts by mole to about 0.75 parts by mole of $Tb_2O_3$, 0 parts by mole to about 0.3 parts by mole of $MnO_2$, about 0.05 parts by mole to about 0.15 parts by mole of $V_2O_5$, about 1.0 part by mole to about 2.0 parts by mole of $BaCO_3$, about 0.5 parts by mole to about 3.0 parts by mole of $SiO_2$, and about 0.4 parts by mole to about 0.6 parts by mole of $Al_2O_3$ based on 100 parts by mole of the dielectric powder.

According to the multilayered capacitor according to some embodiments, high-temperature moisture resistance and withstand voltage characteristics are improved by suppressing oxygen vacancies in dielectric crystal grains included in the dielectric layer.

BRIEF DESCRIPTION OF THE DRAWINGS

FIG. 3 is an exploded perspective view illustrating a stacked structure of internal electrodes in the capacitor body of FIG. 1.

DETAILED DESCRIPTION OF THE EMBODIMENTS

Figure 1:
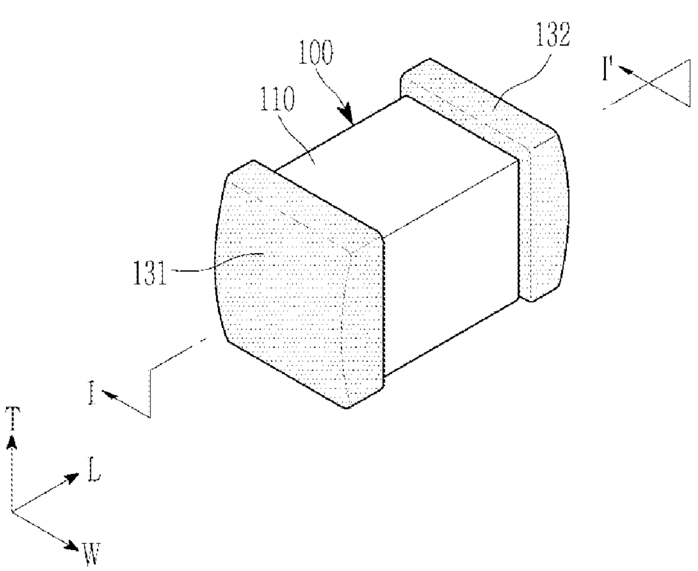
FIG. 1 is a perspective view illustrating a multilayered capacitor according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

The term "about," as used herein, means approximately. In general, the term "about" is used herein to modify a numerical value above and below the stated value by a variance of 10%. In one aspect, the term "about" means plus or minus 20% of the numerical value of the number with which it is being used.

Figure 2:
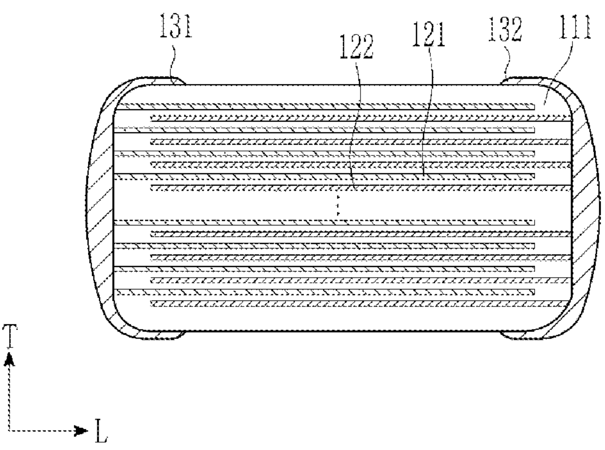
FIG. 2 is a cross-sectional view of the multilayered capacitor taken along line I-I' of FIG. 1.
Figure 3:
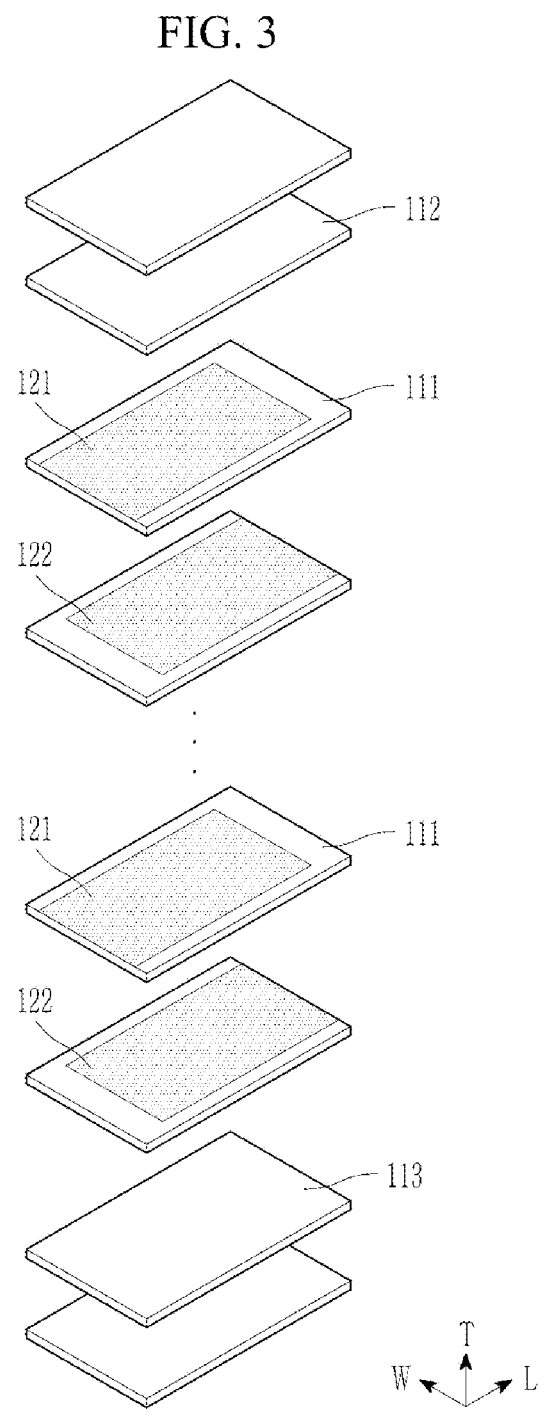

FIG. 1 is a perspective view illustrating a multilayered capacitor 100 according to an embodiment, FIG. 2 is a cross-sectional view of the multilayered capacitor 100 taken along line I-I' of FIG. 1, and FIG. 3 is an exploded perspective view illustrating a stacked structure of internal electrodes in the capacitor body 110 of FIG. 1.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 3, the multilayered capacitor 100 according to the present embodiment may include the capacitor body 110, and first and second external electrodes 131 and 132 disposed at both ends of the capacitor body 110 which face each other in the longitudinal direction (L-axis direction).

The capacitor body 110 may have, for example, a substantially hexahedral shape.

In this embodiment, for convenience of explanation, in the capacitor body 110, surfaces opposite to each other in the thickness direction (T-axis direction) are defined as first and second surfaces, surfaces connected to the first and second surfaces and facing each other in the longitudinal direction (L-axis direction) are defined as third and fourth surfaces, and surfaces connected to the first and second surfaces, connected to the third and fourth surfaces, and facing each other in the width direction (W-axis direction) are defined as fifth and sixth surfaces.

For example, the first surface, which is a lower surface, may be a surface facing a mounting direction. In addition, the first to sixth surfaces may be flat, but the present embodiment is not limited thereto, for example, the first to sixth surfaces may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and the first and second internal electrodes 121 and 122 which are alternately disposed in a thickness direction (T-axis direction) with the dielectric layers 111 interposed therebetween.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayered capacitor 100. For example, the active region may be a region in which the first and second internal electrodes 121 and 122 are stacked and overlapped with each other along the thickness direction (T-axis direction).

The cover regions 112 and 113 may be respectively disposed on the first and the second surfaces of the active region in the thickness direction (T-axis direction) as thickness-direction margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces of the active region in the width direction (W-axis direction). Such a side cover region may be formed by coating a conductive paste layer for an internal electrode only on a portion of the surface of the dielectric green sheet, stacking dielectric green sheets on which a conductive paste layer is not coated on both side surfaces of the dielectric green sheet, and firing the same.

The cover regions 112 and 113 and the side cover regions serve to prevent damage to the first and second internal electrodes 121 and 122 due to physical or chemical stress.

The dielectric layer 111 includes a plurality of dielectric crystal grains.

The dielectric crystal grains include $Ba_x(Ti_{1-y}Zr_y)O_3$ as a main component. The main component is a dielectric base material, has a high dielectric constant, and contributes to forming the dielectric constant of the multilayered capacitor 100.

Herein, at a center of the dielectric crystal grains, $0<y\leq0.0018$, or $0.00005<y\leq0.0018$ may be satisfied. In this case, $0.995\leq x\leq1.010$ may be satisfied.

When a content of zirconium (Zr) is present in a mole ratio of greater than 0 to less than 0.0018 at the center of the dielectric crystal grains, oxygen vacancies in the dielectric crystal grains may be suppressed to improve high-temperature moisture resistance and withstand voltage characteristics.

While not wishing to be bound by any particular theory, Ti ions can readily change their valence to $Ti^{3+}$ or $Ti^{4+}$ states depending on the sintering atmosphere. Therefore, when sintering in a reducing atmosphere, oxygen vacancies may be easily formed around Ti ions. On the other hand, the $Zr^{4+}$ ions have a constant valence. Therefore, when $Zr^{4+}$ ion ions are added, since $Zr^{4+}$ ions have a constant valence regardless of the sintering atmosphere, the valence of the B site of the perovskite is stabilized, thereby suppressing the generation of oxygen vacancies around the B site.

For example, the center of the dielectric crystal grain, in the scanning electron microscope (SEM) image of the dielectric crystal grain of the dielectric layer 111 located at the center of an active region, which is obtained by examining a sample of a cross-section of the capacitor body 110 (hereinafter, referred to as "cross-section sample") cut in the L-axis direction and the T-axis direction from the center of the capacitor body 110 in the W-axis direction with a scanning electron microscope, may be determined as a point where the maximum major axis of the dielectric crystal grain meets the maximum minor axis among the minor axes perpendicular to the maximum major axis.

The cross-section sample of the capacitor body 110 may be prepared, for example, by putting the multilayered capacitor 100 in an epoxy mixed solution and curing it, polishing the L-axis and T-axis sides of the capacitor body 110 to a % point in the W-axis direction, fixing it, and maintaining it in a vacuum atmosphere chamber.

The scanning electron microscope may be for example, Verios G4 manufactured by ThermoFisher Scientific Inc., the measurement conditions are about 10 kV and about 0.2 nA, and the analysis magnification may be about 100 times but as many times as to expose at least about 1, about 3, about 5, or about 10 or more dielectric layers 111.

At the center of the dielectric crystal grain, components of specific elements (e.g., Zr) may be measured by using nano-XRF, for example, Nano-Synchrotron X-Ray Fluorescence (Nano-SXRF). Herein, the measurement is performed by using ID16A-NI (UPBL04) made by ESRF (European Synchrotron Radiation Facility). For example, the cross-section sample of the capacitor body 110 is irradiated with Synchrotron X-rays (about 10 keV or higher) to three times repeatedly measure contents of the specific elements (e.g., Zr) at the center of the dielectric crystal grain and calculate each average value, and in addition, average values of minimum values and maximum values of at least ten different dielectric crystal grains in the same dielectric layer may be taken as final contents of the specific elements.

The dielectric crystal grain may further include a subcomponent along with the main constituent.

For example, the subcomponent may include manganese (Mn), chromium (Cr), silicon (Si), aluminum (Al), magnesium (Mg), tin (Sn), antimony (Sb), germanium (Ge), gallium (Ga), indium (In), barium (Ba), or combinations thereof.

In addition, the subcomponent may further include lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), or combinations thereof.

For example, the dielectric crystal grains may include about 0.5 parts by mole to about 1.0 part by mole of $Dy_2O_3$, about 0.25 parts by mole to about 0.75 parts by mole of $Tb_2O_3$, 0 parts by mole to about 0.3 parts by mole of $MnO_2$, about 0.05 parts by mole to about 0.15 parts by mole of $V_2O_5$, about 1.0 part by mole to about 2.0 parts by mole of $BaCO_3$, about 0.5 parts by mole to about 3.0 parts by mole of $SiO_2$, and about 0.4 parts by mole to about 0.6 parts by mole of $Al_2O_3$ as subcomponents based on 100 parts by mole of the main component. In this case, relative comparison of dielectric change points is easy. The amounts of $MnO_2$ in the dielectric crystal grains may be more than 0 parts by mole based on 100 parts by mole of the main component.

On the other hand, the dielectric crystal grains may have portions having a different mole ratio of the subcomponent to the main component, for example, at least one of the plurality of dielectric crystal grains may have a core-shell structure. The dielectric crystal grain having the core-shell structure includes a dielectric core and a shell surrounding at least a portion of the core.

The core and the shell have a different mole ratio of the subcomponent to the main component, for example, the mole ratio of the subcomponents to the main component may rapidly change at the boundary of the core and the shell. Accordingly, the boundary of the core and the shell may be easily distinguished, which may be confirmed through a transmission electron microscope-energy dispersive X-ray (TEM-EDX) analysis.

For example, the core may include less than or equal to about 0.1 parts by mole of all the subcomponents based on 100 parts by mole of the main component, and the shell may include greater than about 0.1 parts by mole, less than or equal to about 30.0 parts by mole, or greater than about 0.1 parts by mole and less than or equal to about 20.0 parts by mole of the subcomponents based on 100 parts by mole of the main component. When the core includes greater than about 0.1 parts by mole of the subcomponents based on 100 parts by mole of the main component, material properties of a pure dielectric material may be changed, and when the shell includes less than or equal to about 0.1 parts by mole of the subcomponents based on 100 parts by mole of the main component, a dielectric constant according to a temperature may be changed within a large range, but when the shell includes greater than about 30.0 parts by mole of the subcomponents, initial insulation resistance may be lowered.

In other words, the core includes no subcomponents but if any, only in a trace amount. Accordingly, the core may be composed of pure main components alone without impurities, but the pure main components in general may have a higher dielectric constant than main components doped with impurity elements. Accordingly, the core may serve to maintain the dielectric constant.

The shell includes the subcomponents more than the core. In the shell, the subcomponents doped in B-sites of the main components (perovskite $ABO_3$ structure) have an effect of increasing bandgap energy that other rare earth elements and doping elements are diffused into the dielectric crystal grains. Accordingly, the subcomponents may play a role of being a barrier of suppressing the other rare earth elements and the doping elements from diffusing into the dielectric crystal grains. The shell may play a role of suppressing growth of the dielectric crystal grains and contribute to atomization of the dielectric crystal grains. In addition, in the shell, the subcomponents doped in A-sites of the main components may play a role of improving reliability and the dielectric constant.

The dielectric crystal grains may have D50 of about 130 nm to about 170 nm, for example about 138 nm to about 169 nm. When the dielectric crystal grains have D50 of less than about 130 nm, nominal capacitance may not be realized, deteriorating the dielectric constant, but when D50 is greater than about 220 nm, reliability may be deteriorated.

For example, D50 of the dielectric crystal grains is obtained by measuring maximum major axes of at least about 100 dielectric crystal grains in the scanning electron microscope image of the cross-section sample to achieve a size distribution cumulative curve. D50 is a size at about 50% of the size distribution cumulative curve. A coefficient of variation (standard deviation of size/D50) of the dielectric crystal grain size may be about 35% to about 45%, for example about 37% to about 44%. When the coefficient of variation of the dielectric crystal grain size is less than about 35%, moisture resistance reliability of the multilayered capacitor may be deteriorated and if it exceeds 45%, high-temperature reliability may be deteriorated and dispersion may be a problem.

The coefficient of variation of the dielectric crystal grain size is obtained by dividing a standard deviation of the size by D50, and the standard deviation may be calculated according to Equation 1. The standard deviation is obtained by squaring deviations, adding the products up, and dividing the sum by the number of measurements, that is, a square root of a mean of squares of the deviations.

$$\sigma = \sqrt{\frac{1}{n}\sum_{i=1}^{n}(x_i - \bar{x})^2} \quad \text{[Equation 1]}$$

For example, the dielectric layer 111 may have an average thickness (average length in the T-axis direction) of about 2.0 μm to about 8 μm, or about 3.0 μm to about 5.5 μm.

The average thickness of the dielectric layer 111 may be obtained, in the scanning electron microscope (SEM) image of the cross-section sample, by taking a central point in the longitudinal direction (L-axis direction) or the width direction (W-axis direction) of the dielectric layer 111 as a reference point and calculating an arithmetic mean of 10 thicknesses of the dielectric layer 111 at 10 points spaced with predetermined interval from the reference point. The predetermined interval of the 10 points may be adjusted according to a scale of the scanning electron microscope (SEM) image, for example, about 1 μm to about 100 μm, about 1 μm to about 50 μm, or about 1 μm to about 10 μm. Herein, the 10 points must be all located within the dielectric layer 111, but when the 10 points are not located in the dielectric layer 111, the reference point may be relocated, or the intervals of the 10 points may be adjusted.

When the dielectric layer 111 has an average thickness of less than about 2.0 μm or greater than about 8 μm, reliability improvement may not be confirmed.

The first and second internal electrodes 121 and 122 are electrodes having different polarities, and are alternately disposed to face each other along the thickness direction with the dielectric layer 111 interposed therebetween, and one end thereof may be exposed through the third and fourth surfaces of the capacitor body 110.

The first and second internal electrodes 121 and 122 may be electrically insulated from each other by the dielectric layer 111 disposed therebetween.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrodes 121 and 122 may include a conductive metal, for example, a metal such as Ni, Cu, Ag, Pd, or Au, an alloy thereof, for example an Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrodes 121 and 122 may be about 0.1 μm to about 2 μm.

Each average thickness of the first internal electrode 121 and the second internal electrode 122, in the scanning electron microscope (SEM) image of the cross-section sample, may be an arithmetic mean of the thicknesses of the first internal electrode 121 or the second internal electrode 122 at 10 points spaced apart with a predetermined interval from a reference point, which is a central point in the longitudinal direction (L-axis direction) or the width direction (W-axis direction) of the first internal electrode 121 or the second internal electrode 122. The predetermined interval of the 10 points may be adjusted according to a scale of the scanning electron microscope (SEM) image, for example, about 1 μm to about 100 μm, about 1 μm to about 50 μm, or about 1 μm to about 10 μm. Herein, the 10 points must be al located within the first internal electrode 121 or the second internal electrode 122, but when all the 10 points may not be located in the first internal electrode 121 or the second internal electrode 122, the reference point may be relocated, or the interval between the 10 points may be adjusted.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first and second external electrodes 131 and 132 may respectively include first and second connection portions disposed on the third and fourth surfaces of the capacitor body 110 and connected to the first and second internal electrodes 121 and 122, and may also include first and second band portions disposed at each corner where the third and fourth surfaces of the capacitor body 110 and the first and second surfaces or the fifth and sixth surfaces thereof meet.

The first and second band portions may respectively further extend from the first and second connection portions to the portions of the first and second surfaces or the fifth and sixth surfaces of the capacitor body 110. The first and second band portions may serve to improve adhesion strength of the first and second external electrodes 131 and 132.

For example, the first and second external electrode 131 and 132 are configured to cover a sintered metal layer contacting the capacitor body 110, a conductive resin layer configured to cover the sintered metal layer, and a plating layer configured to cover the conductive resin layer, respectively.

The sintered metal layer may include a conductive metal and glass.

For example, the sintered metal layer may include copper (Cu), nickel (Ni), silver (Ag), palladium (Pd), gold (Au), platinum (Pt), tin (Sn), tungsten (W), and titanium. (Ti), lead (Pb), alloy thereof, or combinations thereof as the conductive metal, and for example, the copper (Cu) may include a copper (Cu) alloy. When the conductive metal includes copper, a metal other than copper may be included in an amount of less than or equal to about 5 parts by mole based on 100 mole parts of copper.

For example, the sintered metal layer may include a composition in which oxides are mixed with glass, and may be for example, at least one selected from silicon oxide, boron oxide, aluminum oxide, transition metal oxide, alkali metal oxide, and alkaline earth metal oxide. The transition metal may be selected from zinc (Zn), titanium (Ti), copper (Cu), vanadium (V), manganese (Mn), iron (Fe), and nickel (Ni); the alkali metal may be selected from lithium (Li), sodium (Na), and potassium (K); and the alkaline-earth metal may be selected from magnesium (Mg), calcium (Ca), strontium (Sr), and barium (Ba).

Optionally, the conductive resin layer is formed on the sintered metal layer, and for example, it may be formed to completely cover the sintered metal layer. Meanwhile, the first and second external electrodes 131 and 132 may not include a sintered metal layer, and in this case, the conductive resin layer may directly contact the capacitor body 110.

The conductive resin layer may extend to the first and second surfaces or the fifth and sixth surfaces of the capacitor body 110, and a length of the region (i.e., the band portion) where the conductive resin layer extends to the first and second surfaces or the fifth and sixth surfaces of the capacitor body 110 may be longer than a length of the region (i.e., the band portion) where the sintered metal layer extends to the first and second surfaces or the fifth and sixth surfaces of the capacitor body 110. That is, the conductive resin layer may be formed on the sintered metal layer and completely cover the sintered metal layer.

The conductive resin layer may include a resin and a conductive metal.

The resin included in the conductive resin layer is not particularly limited as long as it has bondability and impact absorption and may be mixed with conductive metal powder to form a paste. For example, the resin may include a phenol resin, an acrylic resin, a silicone resin, an epoxy resin, or a polyimide resin.

The conductive metal included in the conductive resin layer serves to be electrically connected to the first and second internal electrodes 121 and 122 or the sintered metal layer.

The conductive metal included in the conductive resin layer may have a spherical shape, a flake shape, or a combination thereof. That is, the conductive metal may be formed only in a flake shape, only in a spherical shape, or may have a mixed shape of a flake shape and a spherical shape.

Herein, the spherical shape may also include a shape that is not perfectly spherical, and may include a shape in which, for example, a length ratio between a major axis and a minor axis (long axis/short axis) may be less than or equal to about 1.45. The flake-type powder means a powder having a flat and elongated shape, and is not particularly limited, but may have, for example, a length ratio between a major axis and a minor axis (long axis/short axis) of greater than or equal to about 1.95.

The first and second external electrodes 131 and 132 may further include a plating layer outside the conductive resin layer.

The plating layer may include nickel (Ni), copper (Cu), tin (Sn), palladium (Pd), platinum (Pt), gold (Au), silver (Ag), tungsten (W), titanium (Ti), or lead (Pb) alone or an alloy thereof. For example, the plating layer may be a nickel (Ni) plating layer or a tin (Sn) plating layer, and may have a form in which a nickel (Ni) plating layer and a tin (Sn) plating layer are sequentially stacked or a plating layer, a nickel (Ni) plating layer, and a tin (Sn) plating layer may be sequentially stacked. In addition, the plating layer may include a plurality of nickel (Ni) plating layers and/or a plurality of tin (Sn) plating layers.

The plating layer may improve mountability of the multilayered capacitor 100 with a board, structural reliability, external durability, heat resistance, and equivalent series resistance (ESR).

A method of manufacturing a multilayered capacitor according to another example embodiment includes preparing the dielectric powder, manufacturing a capacitor body including a dielectric layer and an internal electrode, and forming an external electrode outside the capacitor body.

Figure 4:
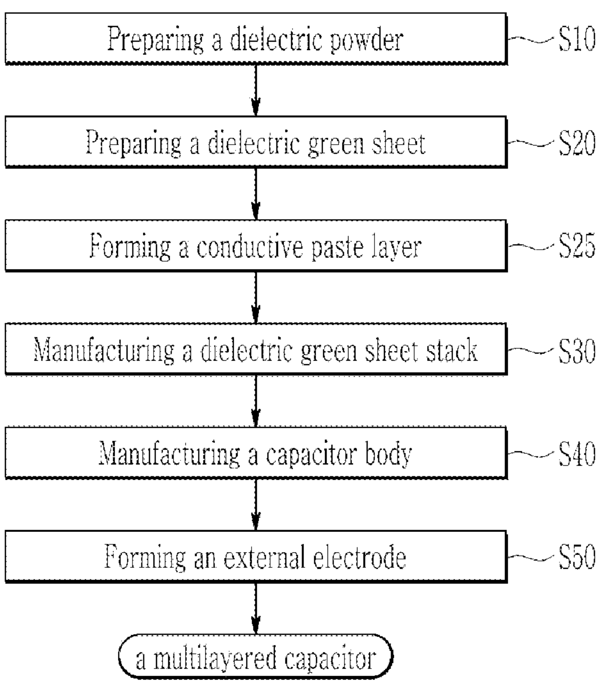
FIG. 4 is a process flow chart illustrating a method of manufacturing a multilayered capacitor according to another embodiment.
Figure 5:
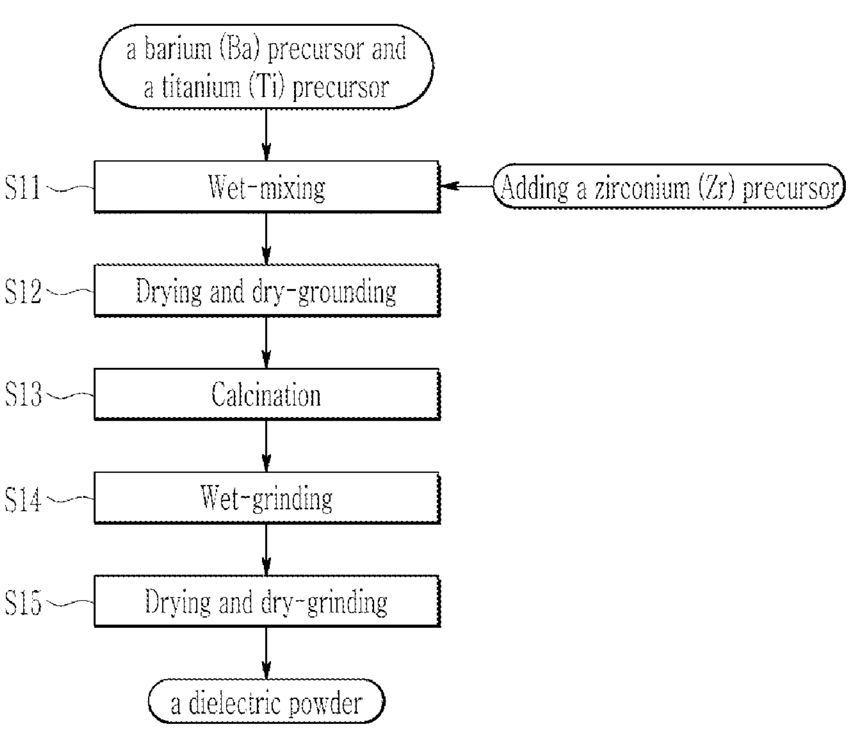
FIG. 5 is a process flow chart illustrating a process of preparing of the dielectric powder in a method of manufacturing a multilayered capacitor.

FIG. 4 is a process flow chart illustrating a method of manufacturing a multilayered capacitor according to another embodiment and FIG. 5 is a process flow chart illustrating a process of preparing of the dielectric powder in a method of manufacturing a multilayered capacitor. Hereinafter, a method of manufacturing a multilayered capacitor is described in detail with reference to FIGS. 4 and 5.

First, a method for manufacturing dielectric powder is described (S10).

A raw material mixture is prepared by adding a zirconium (Zr) precursor while wet mixing a barium (Ba) precursor and a titanium (Ti) precursor (S11).

At this time, by adjusting the amount of the zirconium (Zr) precursor while mixing the barium (Ba) precursor and the titanium (Ti) precursor, the dielectric powder having the formula $Ba_x(Ti_{1-y}Zr_y)O_3(0<y\leq0.0018)$ may be manufactured, and furthermore, dielectric crystal grains may be manufactured using such a dielectric powder to have a composition of $Ba_x(Ti_{1-y}Zr_y)O_3$ wherein $0<y\leq0.0018$ at the center of the dielectric crystal grains.

The barium (Ba) precursor may include at least one selected from the group consisting of $BaO_2$, $BaTiO_3$, $BaCO_3$, BaO, and combinations thereof.

The titanium (Ti) precursor may be an oxide, a salt, or an alkoxide of titanium, and may include, for example, at least one selected from the group consisting of titanium dioxide, titanium diisopropoxide diacetyl acetonate (TPA), titanium alkoxide, and combinations thereof.

The zirconium (Zr) precursor may include at least one selected from the group consisting of $ZrO_2$, $ZrCO_3$, $ZrSO_4$, and combinations thereof.

The wet-mixing may be performed using a disperser such as a bead mill or a ball mill, or performing a high-pressure dispersion treatment to disperse the mixture in a wet manner together with a solvent. For example, in the case of dispersing using a bead mill, beads having a diameter of about 0.03 mm to about 0.1 mm may be used for dispersion treatment in about 5 to about 30 passes at a peripheral speed of about 5 m/s to about 15 m/s.

The solvent used for the wet-mixing may include, for example, an aqueous solvent such as ion-exchanged water, pure water, ultrapure water, or distilled water, or an alcohol-based solvent, or an amine-based solvent such as ammonia, or organic amine may be used together with water.

Optionally, a dispersant may be further added in the mixing of the raw materials, and may include, for example, a polyvinylbutyl-based dispersant, a polyvinylacetal-based dispersant, a polycarbonic acid-based dispersant, a maleic acid-based dispersant, a polyethylene glycol-based dispersant, an allylethercopolymer-based dispersant, and the like.

Optionally, the raw material mixture may be dried and dry-ground (S12).

Next, the raw material mixture is calcined to prepare a dielectric powder (S13).

The calcining may be performed at about 800° C. to about 1000° C. for about 1 hour to about 8 hours, or at about 840° C. to about 900° C. for about 2 hours to about 6 hours.

The calcining may be performed in a vacuum atmosphere or atmospheric pressure atmosphere, for example, in an atmosphere of about 10000 Pa to about 1000000 Pa.

The vacuum atmosphere may be, for example, a vacuum atmosphere of less than or equal to about 20000 Pa, or less than or equal to about 100 Pa.

If the calcination temperature is less than about 800° C. or the calcination time is less than about 1 hour, unreacted and scattering may be a problem, and if the calcination temperature exceeds about 1000° C. or the calcination time is less than about 1 hour, coarse powder may be synthesized.

Optionally, after the wet-grinding the dielectric powder (S14), drying and dry-grinding may be performed (S15).

Next, the manufacturing of the capacitor body is described.

In the manufacturing process of the capacitor body, a dielectric slurry, which becomes a dielectric layer after firing, and a conductive paste, which becomes internal electrodes after firing, are prepared.

The dielectric slurry is prepared, for example, by the following method.

A mixed powder of the main component and the subcomponent is prepared by mixing the main component powder which is the prepared dielectric powder and the subcomponent powder.

For example, the subcomponent powder may include about 0.5 parts by mole to about 1.0 part by mole of $Dy_2O_3$, about 0.25 parts by mole to about 0.75 parts by mole of $Tb_2O_3$, 0 parts by mole to about 0.3 parts by mole of $MnO_2$, about 0.05 parts by mole to about 0.15 parts by mole of $V_2O_5$, about 1.0 part by mole to about 2.0 parts by mole of $BaCO_3$, about 0.5 parts by mole to about 3.0 parts by mole of $SiO_2$, and about 0.4 parts by mole to about 0.6 parts by mole of $Al_2O_3$ based on 100 parts by mole of the dielectric powder. The amounts of $MnO_2$ in the dielectric crystal grains may be more than 0 parts by mole based on 100 parts by mole of the main component.

A dielectric slurry is prepared by mixing the mixed powder of the main component and the subcomponent with a solvent and an additive.

The additive may include, for example, a dispersant, a binder, or a plasticizer, and may further include other additives such as a lubricant and an antistatic agent.

The dispersant may include, for example, a phosphoric acid ester-based dispersant or a polycarboxylic acid-based dispersant. A content of the dispersant may be about 0.1 parts by weight to about 5 parts by weight, or about 0.3 parts by weight to about 3 parts by weight based on 100 parts by weight of the mixed powder of the main component and the subcomponent. When the content of the dispersant is about 0.1 parts by weight to 5 parts by weight, a sufficient effect as a dispersant may be exhibited, and impurities included in the manufactured dielectric layer may be reduced.

The binder may include, for example, an acrylic resin, a polyvinylbutyl resin, a polyvinyl acetal resin, or an ethylcellulose resin. A content of the binder may be about 0.1 part by weight to about 50 parts by weight, or about 3 parts by weight to about 30 parts by weight based on 100 parts by weight of the mixed powder of the main component and the subcomponent. When the content of the binder is about 0.1 parts by weight to about 50 parts by weight, a sufficient effect as a binder may be exhibited, and impurities included in the manufactured dielectric layer may be reduced.

The plasticizer may be, for example, a phthalate-based plasticizer such as dioctyl phthalate, benzyl butyl phthalate, dibutyl phthalate, dihexyl phthalate, di(2-ethylhexyl) phthalate (DOP), or di(2-ethyl butyl) phthalate, an adipate-based plasticizer such as dihexyl adipate or di(2-ethylhexyl) adipate (DOA), a glycol-based plasticizer such as ethylene glycol, diethylene glycol, or triethylene glycol, an ester-based plasticizer such as triethylene glycol dibutyrate, triethylene glycol di(2-ethyl butylate), or triethylene glycol di(2-ethylhexanoate). A content of the plasticizer may be about 0.1 parts by weight to about 20 parts by weight, or about 1 part by weight to about 10 parts by weight based on 100 parts by weight of the mixed powder of the main component and the subcomponent. When the content of the plasticizer is about 0.1 parts by weight to about 20 parts by weight, a sufficient effect as a plasticizer may be exerted, and impurities included in the manufactured dielectric layer may be reduced.

Examples of the solvent may include an aqueous solvent such as water, an alcohol solvent such as ethanol, methanol, benzyl alcohol, and methoxyethanol, a glycol solvent such as ethylene glycol and diethylene glycol, a ketone solvents such as acetone, methyl ethyl ketone, methyl isobutyl ketone, or cyclohexanone, an ester-based solvent such as butyl acetate, ethyl acetate, carbitol acetate, or butyl carbitol acetate, an ether-based solvent such as methyl cellosolve, ethyl cellosolve, butyl ether, or tetrahydrofuran, an aromatic solvent such as benzene, toluene, or xylene. Considering the solubility and dispersibility of various additives included in the dielectric slurry, an alcohol solvent or an aromatic solvent may be used as the solvent. A content of the solvent may be about 50 parts by weight to about 1000 parts by weight, or about 100 parts by weight to about 500 parts by weight based on 100 parts by weight of the mixed powder of the main component and the subcomponent. When the content of the solvent is about 50 parts by weight to about 1000 parts by weight, the main component, subcomponents, and additives can be sufficiently mixed, and the solvent may be easily removed in the subsequent process.

A wet ball mill or a stirring mill may be used to mix the main component and the subcomponent. In the case of using zirconia balls in a wet ball mill, wet-mixing may be performed for about 8 hours to about 48 hours, or about 10 hours to about 24 hours using a plurality of zirconia balls having a diameter of about 0.1 mm to about 10 mm.

Next, the dielectric slurry is molded into a sheet shape (S20).

The method of molding the dielectric slurry into a sheet shape may be a tape molding method such as a doctor blade method or a calender roll method, and for example, an on-roll forming coater of a head discharge method may be used, and then the molded body may be dried to obtain a dielectric green sheet.

The conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is coated in a predetermined pattern by various printing methods such as screen printing or a transfer method (S25). After stacking a plurality of layers of dielectric green sheets on which internal electrode patterns are formed, a dielectric green sheet stack is obtained by pressing in the stacking direction (S30). At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then, the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack is treated to remove the binder and fired, obtaining the capacitor body (S40).

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining about 180° C. to about 400° C. for about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1200° C. to about 1350° C. or about 1220° C. to about 1300° C. for about 0.5 hours to about 8 hours or about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be about $1.0\times10^{-14}$ MPa to about $1.0\times10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for about 0 hour to about 20 hours by increasing the temperature at about 50° C./hour to about 500° C./hour. The annealing may be performed under a humid nitrogen gas ($N_2$) atmosphere, wherein an oxygen partial pressure may be about 1.0×10−9 MPa to about 1.0×10−5 MPa.

In the binder removal treatment, the firing treatment, or the annealing treatment, in order to humidify nitrogen gas, mixed gas, or the like, a wetter or the like may be for example, used, wherein a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrodes on the outer surfaces of the third and fourth surfaces, thereby improving the electrical connection of the first and second external and the first and second internal electrodes and easily forming the alloy portion.

On the outer surface of the capacitor body, the external electrode is formed (S50).

For example, a sintered metal layer may be formed by coating a paste for forming a sintered metal layer on an external electrode and then sintering the paste.

The paste for forming the sintered metal layer may include a conductive metal and glass. The conductive metal and glass are the same as above and will not be repeatedly illustrated. In addition, the paste for forming the sintered metal layer may optionally include a subcomponent such as a binder, a solvent, a dispersant, a plasticizer, or oxide powder. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

A method of coating the paste for forming the sintered metal layer on the outer surface of the capacitor body may include various printing methods such as a dip method, or screen printing, and the like, a coating method by using a dispenser, a spray method by using a spray, and the like. The paste for forming the sintered metal layer may be coated on at least the third and fourth surfaces of the capacitor body and optionally, on a portion of the first surface, the second surface, the fifth surface, or the sixth surface where the band portions of the first and second external electrodes are formed.

Thereafter, the capacitor body on which the paste for forming the sintered metal layer is coated is dried, and sintered at a temperature of about 700° C. to about 1000° C. for about 0.1 hour to about 3 hours to form a sintered metal layer.

Optionally, on the outer surface of the obtained capacitor body, a paste for forming a conductive resin layer is coated and cured to form a conductive resin layer.

The paste for forming the conductive resin layer may include a resin and optionally, a conductive metal or a non-conductive filler. The conductive metal and the resin are the same as described above and will not be repeated illustrated again. In addition, the paste for forming the conductive resin layer may optionally include a subcomponent such as a binder, a solvent, a dispersant, a plasticizer, or an oxide powder. For example, the binder may include ethyl cellulose, acryl, butyral, or the like, and the solvent may include an organic solvent such as terpineol, butyl carbitol, alcohol, methylethylketone, acetone, or toluene, or an aqueous solvent.

For example, a method of forming the conductive resin layer may include dipping the capacitor body 110 into the paste for forming the conductive resin layer to form the conductive resin layer and curing it, screen-printing or gravure-printing the paste for forming the conductive resin layer on the surface of the capacitor body 110, or coating the paste for forming the conductive resin layer on the surface of the capacitor body 110 and then curing it.

Subsequently, a plating layer is formed outside the conductive resin layer.

For example, the plating layer may be formed by a plating method, or may be formed by sputtering or electroplating (electric deposition).

Hereinafter, specific embodiments of the invention are presented. However, the examples described below are only for specifically illustrating or explaining the invention, and the scope of the invention is not limited thereto.

Preparation Examples

Preparation Example 1: Preparation of Dielectric Powder $BaCO_3$ powder as a barium (Ba) precursor, $TiO_2$ powder as a titanium (Ti) precursor, and $ZrO_2$ as a zirconium (Zr) precursor were prepared and weighed in a weight ratio shown in Table 1. The weighed $BaCO_3$ powder and $TiO_2$ powder were put in a beaker, and water was added thereto and then, wet-mixed with a mixer. At this time, a raw material mixture was prepared by dispersing $ZrO_2$ in a bead mill while adjusting the input amount.

The prepared raw material mixture was dried, and the agglomerated raw material mixture was dry-ground.

The obtained raw material mixture was calcinated under a vacuum or normal pressure atmosphere at 950° C. for 3 hours, preparing dielectric powder.

After the calcination, the agglomerated dielectric powder was wet-ground and dried, and the agglomerated raw material mixture was dry-ground, obtaining dielectric powder.

TABLE 1

| | Zr content in barium titanite powder $Ba_{0.9970}Ti_{(1-y)}Zr_yO_3$ |
|---|---|
| Comp. Ex. 1 | 0 |
| Ex. 1 | 0.00005 ± 0.00003 |
| Ex. 2 | 0.0002 ± 0.00003 |
| Ex. 3 | 0.0004 ± 0.00003 |
| Ex. 4 | 0.0006 ± 0.00003 |
| Ex. 5 | 0.0008 ± 0.00003 |
| Ex. 6 | 0.0010 ± 0.00003 |
| Ex. 7 | 0.0012 ± 0.00003 |
| Ex. 8 | 0.0014 ± 0.00003 |
| Ex. 9 | 0.0016 ± 0.00003 |
| Ex. 10 | 0.0018 ± 0.00003 |
| Comp. Ex. 2 | 0.0020 ± 0.00003 |

Preparation Example 2: Manufacturing of Multilayered Capacitor

The barium titanite powder prepared in Preparation Example 1 was used as a main component of a dielectric base material, and subcomponents were used in compositions shown in Table 2.

The main component powder and subcomponent powder of the dielectric base material were mixed by using zirconium ($ZrO_2$) balls as a dispersive medium with ethanol/toluene, a dispersant, and a binder and then, mechanically milled, preparing dielectric slurry.

The prepared dielectric slurry was manufactured into a dielectric green sheet by using an on-roll forming coater in a head discharge method.

On the surface of the dielectric green sheet, a conductive paste layer including nickel (Ni) was printed, and the dielectric green sheets having the conductive paste layer (width×length×height=3.2 mm×2.5 mm×2.5 mm) are stacked and compressed, obtaining a dielectric green sheet stack.

The dielectric green sheet stack was subjected to a firing process at 400° C. or less under a nitrogen atmosphere and a firing process at 1300° C. or less at a hydrogen ($H_2$) concentration of 1.0% or less, manufacturing each multilayered capacitor according to examples and comparative examples.

TABLE 2

| $BaTiO_3$ | $Dy_2O_3$ | $Tb_2O_3$ | $MnO_2$ | $V_2O_5$ | $BaCO_3$ | $SiO_2$ | $Al_2O_3$ |
|---|---|---|---|---|---|---|---|
| Comp. Ex. 1 | 0.5-1 | 0.25-0.75 | 0-0.3 | 0.05-0.15 | 1.5 | 0.5-3 | 0.4-0.6 |
| Ex. 1 | 0.5-1 | 0.25-0.75 | 0-0.3 | 0.05-0.15 | 1.5 | 0.5-3 | 0.4-0.6 |
| Ex. 2 | 0.5-1 | 0.25-0.75 | 0-0.3 | 0.05-0.15 | 1.5 | 0.5-3 | 0.4-0.6 |
| Ex. 3 | 0.5-1 | 0.25-0.75 | 0-0.3 | 0.05-0.15 | 1.5 | 0.5-3 | 0.4-0.6 |
| Ex. 4 | 0.5-1 | 0.25-0.75 | 0-0.3 | 0.05-0.15 | 1.5 | 0.5-3 | 0.4-0.6 |
| Ex. 5 | 0.5-1 | 0.25-0.75 | 0-0.3 | 0.05-0.15 | 1.5 | 0.5-3 | 0.4-0.6 |
| Ex. 6 | 0.5-1 | 0.25-0.75 | 0-0.3 | 0.05-0.15 | 1.5 | 0.5-3 | 0.4-0.6 |
| Ex. 7 | 0.5-1 | 0.25-0.75 | 0-0.3 | 0.05-0.15 | 1.5 | 0.5-3 | 0.4-0.6 |
| Ex. 8 | 0.5-1 | 0.25-0.75 | 0-0.3 | 0.05-0.15 | 1.5 | 0.5-3 | 0.4-0.6 |
| Ex. 9 | 0.5-1 | 0.25-0.75 | 0-0.3 | 0.05-0.15 | 1.5 | 0.5-3 | 0.4-0.6 |
| Ex. 10 | 0.5-1 | 0.25-0.75 | 0-0.3 | 0.05-0.15 | 1.5 | 0.5-3 | 0.4-0.6 |
| Comp. Ex. 2 | 0.5-1 | 0.25-0.75 | 0-0.3 | 0.05-0.15 | 1.5 | 0.5-3 | 0.4-0.6 |

Experimental Examples

Experimental Example 1

In the multilayered capacitors according to the examples and the comparative examples, a content of zirconium was measured at the center of dielectric crystal grains, and the results are shown in Tables 3 and 4.

The multilayered capacitors were put in an epoxy mixed solution and cured, and the side surfaces of the capacitor body 110 in the L-axis direction and the T-axis direction were polished to a % point in the W-axis direction, fixed, and maintained in a vacuum atmosphere chamber, obtaining a cross-section sample of the capacitor body 110.

A Nano-Synchrotron X-Ray Fluorescence (Nano-SXRF) analysis was performed on the cross-section sample of the capacitor body 110 by using ID16A-NI (UPBL04) manufactured by ESRF (European Synchrotron Radiation Facility). Herein, a content of zirconium at the center of dielectric crystal grains was measured by irradiating Synchrotron X-ray (10 keV or higher) three times or more, from which an average value was calculated. In addition, an average value of minimum and maximum values measured in ten different dielectric crystal grains in the same dielectric layer was regarded as a final content of zirconium.

For example, a content of zirconium (Zr) at the center of ten different dielectric crystal grains measured in Example 6 is shown in Table 3. In addition, Table 4 shows minimum values, maximum values, and average values of the contents of zirconium (Zr) at the center of dielectric crystal grains in the examples and the comparative examples.

TABLE 3

| | Contents of zirconium (Zr) at the center of dielectric crystal grains |
|---|---|
| Point 1 | 0.00101 |
| Point 2 | 0.00100 |
| Point 3 | 0.00102 |
| Point 4 | 0.00099 |
| Point 5 | 0.00100 |
| Point 6 | 0.00098 |
| Point 7 | 0.00103 |
| Point 8 | 0.00101 |
| Point 9 | 0.00100 |
| Point 10 | 0.00101 |
| average | 0.00100 |

TABLE 4

| | Contents of zirconium (Zr) at the center of dielectric crystal grains ($Ba_{0.9970}Ti_{(1-y)}Zr_yO_3$) | | |
|---|---|---|---|
| | y (Avg.) | y (Min.) | y (Max.) |
| Comp. Ex. 1 | 0 | 0 | 0.00001 |
| Ex. 1 | 0.00005 | 0.00003 | 0.00008 |
| Ex. 2 | 0.0002 | 0.00018 | 0.00022 |
| Ex. 3 | 0.0004 | 0.00037 | 0.00042 |
| Ex. 4 | 0.0006 | 0.00058 | 0.00063 |
| Ex. 5 | 0.0008 | 0.00077 | 0.00081 |
| Ex. 6 | 0.0010 | 0.00098 | 0.00103 |
| Ex. 7 | 0.0012 | 0.00118 | 0.00123 |
| Ex. 8 | 0.0014 | 0.00138 | 0.00142 |
| Ex. 9 | 0.0016 | 0.00157 | 0.00163 |
| Ex. 10 | 0.0018 | 0.00179 | 0.00182 |
| Comp. Ex. 2 | 0.0020 | 0.00198 | 0.00202 |

Referring to Tables 3 and 4, the multilayered capacitors according to the examples satisfied $0<y\leq 0.0018$ at a center of the dielectric crystal grains.

In addition, the multilayered capacitors of the examples and the comparative examples were measured with respect to D50 of dielectric crystal grains and a coefficient of variation, and the results are shown in Table 5.

Regarding the cross-section sample of the capacitor body 110, a scanning electron microscope image of dielectric crystal grains at the center of an active region in the dielectric layer 111 is taken under conditions of 10 kV and 0.2 nA by using Verios G4 manufactured by Thermofisher Scientific Inc.

In the obtained scanning electron microscope image, the longest major axis of at least 100 dielectric crystal grains was measured to obtain a size distribution curve, from which D10, D50, D90 and a coefficient of variation (standard deviation/D50) were calculated, and the results are shown in Table 5.

TABLE 5

| | CV (standard deviation/D50) | D10 (nm) | D50 (nm) | D90 (nm) |
|---|---|---|---|---|
| Comp. Ex. 1 | 43-50% | 75 ± 25 | 150 ± 35 | 250 ± 40 |
| Ex. 1 | 35-45% | 85 ± 20 | 150 ± 20 | 250 ± 20 |
| Ex. 2 | 35-45% | 85 ± 20 | 150 ± 20 | 250 ± 20 |
| Ex. 3 | 35-45% | 85 ± 20 | 150 ± 20 | 250 ± 20 |
| Ex. 4 | 35-45% | 85 ± 20 | 150 ± 20 | 250 ± 20 |
| Ex. 5 | 35-45% | 85 ± 20 | 150 ± 20 | 250 ± 20 |
| Ex. 6 | 35-45% | 85 ± 20 | 150 ± 20 | 250 ± 20 |
| Ex. 7 | 35-45% | 85 ± 20 | 150 ± 20 | 250 ± 20 |
| Ex. 8 | 35-45% | 85 ± 20 | 150 ± 20 | 250 ± 20 |
| Ex. 9 | 35-45% | 85 ± 20 | 150 ± 20 | 250 ± 20 |
| Ex. 10 | 35-45% | 85 ± 20 | 150 ± 20 | 250 ± 20 |
| Comp. Ex. 2 | 35-45% | 85 ± 20 | 150 ± 20 | 250 ± 20 |

Referring to Table 5, the multilayered capacitors according to the examples exhibited D50 of the dielectric crystal grains in a range of 130 nm to 170 nm and a coefficient of variation (standard deviation/D50) of the dielectric crystal grain size in a range of 35% to 45%.

Experimental Example 2

The multilayered capacitors according to the examples and the comparative examples were evaluated with respect to a breakdown voltage (BDV), and the results are shown in Table 6.

The multilayered capacitors according to the examples and the comparative examples were prepared respectively by 50, and the breakdown voltage (BDV) thereof is obtained by measuring a voltage where a current becomes 20 mA, while a voltage from 0 V to 1.00000 V is applied to 1100 V thereto in a sweep method, by using Model No. 2410 manufactured by Keithely Instruments, Inc. The breakdown voltage (BDV) is measured in a silicone oil bath.

TABLE 6

| | BDV average | BDV minimum value | BDV scattering (standard deviation/average) |
|---|---|---|---|
| Comp. Ex. 1 | 220 | 153 | 0.13 |
| Ex. 1 | 302 | 273 | 0.12 |
| Ex. 2 | 311 | 269 | 0.11 |
| Ex. 3 | 312 | 279 | 0.11 |
| Ex. 4 | 320 | 271 | 0.13 |
| Ex. 5 | 309 | 266 | 0.12 |
| Ex. 6 | 321 | 272 | 0.11 |
| Ex. 7 | 319 | 269 | 0.11 |
| Ex. 8 | 323 | 274 | 0.13 |
| Ex. 9 | 321 | 275 | 0.11 |
| Ex. 10 | 318 | 271 | 0.12 |
| Comp. Ex. 2 | 311 | 176 | 0.24 |

Referring to Table 6, the multilayered capacitor of Comparative Example 1 exhibited a very low BDV average of 220, and the multilayered capacitor of Comparative Example 2 exhibited very low minimum BDV values of 176, respectively, and very large BDV scattering of 0.24, respectively.

In addition, reliability under high-temperature severe conditions and moisture resistance reliability of the multilayered capacitors manufactured in the examples were evaluated, and the results are shown in Table 7.

The multilayered capacitors of the examples and the comparative examples were prepared respectively by 40 and mounted on a regular board, and reliability under high-temperature and severe conditions were evaluated by conducting a highly accelerated life test under conditions of 150° C., 150 hours, and 100 V with ESPEC (PV-222, HALT) equipment, and moisture resistance reliability is measured under conditions of 85° C., relative humidity (R.H.) of 85%, 32 V, and 24 hours by using ESPEC (PR-3J, 8585) equipment.

TABLE 7

| | Reliability under high-temperature and severe conditions (Mean time to first failure) (h) | Reliability under high-temperature and severe conditions (Mean time between failures) (h) | Moisture resistance reliability (Failure time) (h) |
|---|---|---|---|
| Comp. Ex. 1 | 90 | 98 | 32 |
| Ex. 1 | 90 | 97 | No short |
| Ex. 2 | 91 | 95 | No short |
| Ex. 3 | 95 | 99 | No short |
| Ex. 4 | 92 | 96 | No short |
| Ex. 5 | 97 | 102 | No short |
| Ex. 6 | 97 | 101 | No short |
| Ex. 7 | 107 | 109 | No short |
| Ex. 8 | 105 | 107 | No short |
| Ex. 9 | 104 | 108 | No short |
| Ex. 10 | 98 | 103 | No short |
| Comp. Ex. 2 | 65 | 76 | No short |

Referring to Table 7, the multilayered capacitor manufactured in Comparative Example 1 exhibited inferior moisture resistance reliability, and the multilayered capacitor manufactured in Comparative Example 2 exhibited very low reliability under high-temperature and severe conditions.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

100: multilayered capacitor
110: capacitor body
111: dielectric layer
112, 113: cover region
121: first internal electrode
122: second internal electrode
131: first external electrode
132: second external electrode

What is claimed is:

1. A multilayered capacitor, comprising a capacitor body including a dielectric layer and an internal electrode, and an external electrode disposed on an outer surface of the capacitor body, wherein the dielectric layer includes a plurality of dielectric crystal grains, at least one of the plurality of dielectric crystal grains includes $Ba_x(Ti_{1-y}Zr_y)O_3$ wherein $0.995 \leq x \leq 1.010$ as a main component and satisfy $0<y\leq0.0018$ at a center of the dielectric crystal grains, D50 of the plurality of dielectric crystal grains is about 130 nm to about 170 nm, and a coefficient of variation (standard deviation of size/D50) of the plurality of dielectric crystal grain is 35% to 45%.

2. The multilayered capacitor of claim 1, wherein at least one of the plurality of dielectric crystal grains satisfies $0.00005<y\leq0.0018$ at the center of the plurality of dielectric crystal grains.

3. The multilayered capacitor of claim 1, wherein at least one of the plurality of dielectric crystal grains includes about 0.5 parts by mole to about 1.0 part by mole of $Dy_2O_3$, about 0.25 parts by mole to about 0.75 parts by mole of $Tb_2O_3$, 0 parts by mole to about 0.3 parts by mole of $MnO_2$, about 0.05 parts by mole to about 0.15 parts by mole of $V_2O_5$, about 1.0 part by mole to about 2.0 parts by mole of $BaCO_3$, about 0.5 parts by mole to about 3.0 parts by mole of $SiO_2$, and about 0.4 parts by mole to about 0.6 parts by mole of $Al_2O_3$ as subcomponents based on 100 parts by mole of the main component.

4. The multilayered capacitor of claim 3, wherein at least one of the plurality of dielectric crystal grains has a core-shell structure, a shell of the core-shell structure includes all subcomponents in an amount of greater than about 0.1 moles and less than about 30.0 moles relative to 100 moles of the main component, and a core of the core-shell structure includes a total amount of the subcomponents in an amount of less than or equal to about 0.1 moles relative to 100 moles of the main component.

5. The multilayered capacitor of claim 1, wherein an average thickness of the dielectric layer is about 2.0 μm to about 3.5 μm.

6. A multilayered capacitor, comprising a capacitor body including a dielectric layer and an internal electrode, and an external electrode disposed on an outer surface of the capacitor body, wherein the dielectric layer includes a plurality of dielectric crystal grains, at least one of the plurality of dielectric crystal grains includes $Ba_x(Ti_{1-y}Zr_y)O_3$ as a main component and satisfy $0<y\leq0.0018$ at a center of the dielectric crystal grains, and at least one of the plurality of dielectric crystal grains include about 0.5 parts by mole to about 1.0 part by mole of $Dy_2O_3$, about 0.25 parts by mole to about 0.75 parts by mole of $Tb_2O_3$, 0 parts by mole to about 0.3 parts by mole of $MnO_2$, about 0.05 parts by mole to about 0.15 parts by mole of $V_2O_5$, about 1.0 part by mole to about 2.0 parts by mole of $BaCO_3$, about 0.5 parts by mole to about 3.0 parts by mole of $SiO_2$, and about 0.4 parts by mole to about 0.6 parts by mole of $Al_2O_3$ as subcomponents based on 100 parts by mole of the main component.

7. The multilayered capacitor of claim 6, wherein

D50 of the plurality of dielectric crystal grains is about 130 nm to about 170 nm.

8. The multilayered capacitor of claim 6, wherein a coefficient of variation (standard deviation of size/D50) of the plurality of dielectric crystal grain is about 35% to about 45%.

9. The multilayered capacitor of claim 6, wherein an average thickness of the dielectric layer is about 2.0 μm to about 3.5 μm.

10. The multilayered capacitor of claim 6, wherein at least one of the plurality of dielectric crystal grains has a core-shell structure, wherein a shell of the core-hell structure includes the subcomponents in an amount of greater than about 0.1 moles and less than about 30.0 moles based on 100 moles of the main component, and a core of the core-shell structure includes the subcomponents in an amount of less than or equal to about 0.1 moles based on 100 moles of the main component.

* * * * *